United States Patent
Yun

(10) Patent No.: US 11,853,055 B2
(45) Date of Patent: Dec. 26, 2023

(54) VEHICLE, SERVER, CONTROL METHOD OF VEHICLE AND CONTROL METHOD OF SERVER

(71) Applicants: HYUNDAI MOTOR COMPANY, Seoul (KR); KIA MOTORS CORPORATION, Seoul (KR)

(72) Inventor: HyunChul Yun, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 949 days.

(21) Appl. No.: 16/263,445

(22) Filed: Jan. 31, 2019

(65) Prior Publication Data

US 2020/0125085 A1    Apr. 23, 2020

(30) Foreign Application Priority Data

Oct. 17, 2018   (KR) ........................ 10-2018-0123504

(51) Int. Cl.
*H04W 4/40*  (2018.01)
*H04W 12/069* (2021.01)
(Continued)

(52) U.S. Cl.
CPC ......... *G05D 1/0022* (2013.01); *B60W 50/087* (2013.01); *G05D 1/0088* (2013.01);
(Continued)

(58) Field of Classification Search
CPC .. G05D 1/0022; G05D 1/0061; G05D 1/0088; G05D 2201/0213; G05D 1/0223; G05D 1/0214; G05D 1/0221; G05D 1/0278; G05D 1/028; G05D 1/0285; H04W 12/069; H04W 4/40; B60W 50/087; B60W 2556/45; B60W 50/10; B60W 30/14; B60W 50/16; B60W 2050/0094; B60R 25/10; H04L 9/0866; H04L 9/321; H04L 2209/84

See application file for complete search history.

(56) References Cited

U.S. PATENT DOCUMENTS

| | | | |
|---|---|---|---|
| 2008/0095163 A1* | 4/2008 | Chen | H04L 45/16 370/392 |
| 2015/0092661 A1* | 4/2015 | Huang | H04W 40/248 370/315 |

(Continued)

*Primary Examiner* — Jeffrey C Boomer
(74) *Attorney, Agent, or Firm* — LEMPIA SUMMERFIELD KATZ LLC

(57) ABSTRACT

A vehicle includes at least one output device; an input device configured to receive at least one in-vehicle input from a user; a communication device configured to receive an operation authentication message including an operation request message, an encryption key, and priority setting information from an external server; and a controller configured to generate a new operation request signal corresponding to the operation request message when the encryption key is identical to an encryption key of the vehicle stored in advance, determine priority between the new operation request signal and at least one existing operation request signal corresponding to the at least one in-vehicle input based on the priority setting information, and control an output device corresponding to a target operation to perform the target operation based on the priority.

17 Claims, 10 Drawing Sheets

(51) Int. Cl.
*G05D 1/00* (2006.01)
*B60W 50/08* (2020.01)

(52) U.S. Cl.
CPC ........... *H04W 4/40* (2018.02); *H04W 12/069* (2021.01); *G05D 2201/0213* (2013.01)

(56) References Cited

U.S. PATENT DOCUMENTS

| | | | | |
|---|---|---|---|---|
| 2016/0362084 | A1* | 12/2016 | Martin | G01C 21/34 |
| 2016/0375767 | A1* | 12/2016 | Konet | B60K 35/00 |
| | | | | 701/23 |
| 2019/0123923 | A1* | 4/2019 | Belleschi | H04L 1/1671 |
| 2019/0163186 | A1* | 5/2019 | Yoon | G08C 17/00 |
| 2023/0111748 | A1* | 4/2023 | Park | B60W 40/08 |
| | | | | 340/573.1 |

* cited by examiner

| Priority | ID |
|---|---|
| 1 | REQ1 |
| 2 | REQ2 |
| 3 | REQ3 |
| 4 | REQ4 |
| - | REQ5 |

| Priority | ID |
|---|---|
| 2 | REQ1 |
| 3 | REQ2 |
| 4 | REQ3 |
| 5 | REQ4 |
| 1 | REQ5 |

<BEFORE PRIORITY UPDATE>   <AFTER PRIORITY UPDATE>

VEHICLE, SERVER, CONTROL METHOD OF VEHICLE AND CONTROL METHOD OF SERVER

CROSS-REFERENCE TO RELATED APPLICATION

This application is based on and claims priority under 35 U.S.C. § 119 to Korean Patent Application No. 10-2018-0123504 filed on Oct. 17, 2018, in the Korean Intellectual Property Office, the disclosure of which is incorporated herein by reference in its entirety.

BACKGROUND

1. Field

The present disclosure relates to a server and vehicle for controlling an external request for an operation of the vehicle.

2. Discussion of Related Art

Autonomous driving control, which is currently under development, is classified largely into four stages from the first stage defining automation of particular functions such as automatic braking and automatic speed control to the fourth stage defining automation in every environment without intervention of the user.

In the environment for autonomous driving control, for the safety of autonomous driving of a vehicle, intelligent roads or control over operation of a vehicle, which can be performed by an external device such as other vehicle or a cloud server, should come ahead of the user's control over operation of the vehicle.

Accordingly, studies on controlling a request for an operation of a vehicle from other vehicle and using the result in controlling operation of the vehicle are now being actively conducted.

SUMMARY

The present disclosure provides a server and control method thereof for authenticating a new operation request for a vehicle from an external device outside the vehicle and determining priority between the new operation request and an operation request made inside the vehicle, and also provides a vehicle and control method thereof for determining whether a new operation request for a vehicle from an external device is authenticated and arbitrating priority between the new operation request and an operation request made inside the vehicle to perform an operation.

In accordance with an aspect of the present disclosure, a vehicle includes at least one output device; an input device configured to receive at least one in-vehicle input from a user; a communication device configured to receive an operation authentication message including an operation request message, an encryption key, and priority setting information from an external server; and a controller configured to generate a new operation request signal corresponding to the operation request message when the encryption key is identical to an encryption key of the vehicle stored in advance, determine priority between the new operation request signal and at least one existing operation request signal corresponding to the at least one in-vehicle input based on the priority setting information, and control an output device corresponding to a target operation to perform the target operation based on the priority.

The operation request message may include an input signal to instruct execution of the target operation on the vehicle, the instruction to execute the target operation being authenticated by the external server based on driving condition information of the vehicle.

The controller may control the communication device to send the vehicle's vehicle identification number and encryption key, which are stored in advance, to the external server.

The priority setting information may be determined by the external server based on driving condition information of the vehicle and may include priority between the new operation request signal and the at least one existing operation request signal.

The controller may control the output device corresponding to the target operation to perform the target operation based on the new operation request signal, when the new operation request signal takes priority over the at least one existing operation request signal.

The controller may have at least one input interface configured to receive an input signal corresponding to at least one operation of the vehicle, and may generate an operation request signal corresponding to the input signal, determine an input interface corresponding to a target operation in the operation request message, and control the input interface corresponding to the target operation to generate the new operation request signal.

The controller may obtain at least one of login information of the target operation and a load condition of an output device corresponding to the target operation from the output device corresponding to the target operation, determine whether the target operation has been performed based on the at least one of the login information and the load condition, and control the communication device to send a feedback message indicating whether the target operation has been performed to the external server.

In accordance with another embodiment of the present disclosure, a server includes a communication device; a storage configured to store a vehicle identification number and encryption key received from a vehicle; and a controller configured to authenticate an instruction to execute a target operation in an operation request message for the vehicle based on driving condition information of the vehicle when receiving the operation request message from an external device, determine priority setting information corresponding to the operation request message based on the driving condition information of the vehicle, and control the communication device to send an operation authentication message including the operation request message, the encryption key, and the priority setting information to the vehicle.

The controller may generate an operation request message for the vehicle based on driving condition information of the vehicle.

The operation request message may include an input signal to instruct execution of the target operation on the vehicle.

The controller may authenticate the instruction to execute the target operation in the operation request message based on the driving condition information of the vehicle and pre-stored information about a relation between the driving condition information of the vehicle and the target operation.

The priority setting information may include priority between a new operation request signal corresponding to the operation request message and at least one existing operation request signal corresponding to at least one in-vehicle input.

The controller may determine the priority setting information based on the driving condition information of the vehicle and the pre-stored information about a relation between the driving condition information of the vehicle and the target operation.

The controller may determine whether to resend the operation authentication message based on a feedback message indicating whether the target operation has been performed when receiving the feedback message from the vehicle.

The controller may control the communication device to resend the operation authentication message when failing to receive the feedback message for a predetermined period of time.

In accordance with another aspect of the present disclosure, a control method of a vehicle including at least one output device, an input device configured to receive at least one in-vehicle input from a user, and a communication device is provided. The control method includes receiving an operation authentication message including an operation request message, an encryption key, and priority setting information from an external server; generating a new operation request signal corresponding to the operation request message when the encryption key is identical to an encryption key of the vehicle stored in advance; determining priority between the new operation request signal and at least one existing operation request signal corresponding to the at least one in-vehicle input based on the priority setting information; and controlling an output device corresponding to a target operation to perform the target operation based on the priority.

The operation request message may include an input signal to instruct execution of the target operation on the vehicle, the instruction to execute the target operation being authenticated by the external server based on driving condition information of the vehicle.

The control method may further include controlling the communication device to send the vehicle's vehicle identification number and encryption key, which are stored in advance, to the external server.

The priority setting information may be determined by the external server based on driving condition information of the vehicle and may include priority between the new operation request signal and the at least one existing operation request signal.

The controlling of the output device corresponding to the target operation may include controlling the output device corresponding to the target operation to perform the target operation based on the new operation request signal, when the new operation request signal takes priority over the at least one existing operation request signal.

The vehicle may have at least one input interface configured to receive an input signal corresponding to at least one operation of the vehicle and generate an operation request signal corresponding to the input signal, and the control method of the vehicle may further include determining an input interface corresponding to a target operation in the operation request message, and controlling the input interface corresponding to the target operation to generate the new operation request signal.

The control method may further include obtaining at least one of login information of the target operation and a load condition of an output device corresponding to the target operation from the output device corresponding to the target operation, determining whether the target operation has been performed based on the at least one of the login information and the load condition, and controlling the communication device to send a feedback message indicating whether the target operation has been performed to the external server.

In accordance with another embodiment of the present disclosure, a control method of a server including a communication device and a storage is provided. The control method includes storing a vehicle identification number and encryption key received from a vehicle; authenticating an instruction to execute a target operation in an operation request message for the vehicle based on driving condition information of the vehicle when receiving the operation request message from an external device; determining priority setting information corresponding to the operation request message based on the driving condition information of the vehicle; and controlling the communication device to send an operation authentication message including the operation request message, the encryption key, and the priority setting information to the vehicle.

The control method may further include generating an operation request message for the vehicle based on driving condition information of the vehicle.

The operation request message may include an input signal to instruct execution of the target operation on the vehicle.

The authenticating of the instruction to execute the target operation in the operation request message may include authenticating the instruction to execute the target operation in the operation request message based on driving condition information of the vehicle and pre-stored information about a relation between the driving condition information of the vehicle and the target operation.

The priority setting information may include priority between a new operation request signal corresponding to the operation request message and at least one existing operation request signal corresponding to at least one in-vehicle input.

The determining of the priority setting information may include determining the priority setting information based on the driving condition information of the vehicle and the pre-stored information about a relation between the driving condition information of the vehicle and the target operation.

The control method may further include determining whether to resend the operation authentication message based on a feedback message indicating whether the target operation has been performed when receiving the feedback message from the vehicle.

The control method may further include controlling the communication device to resend the operation authentication message when failing to receive the feedback message for a predetermined period of time.

BRIEF DESCRIPTION OF THE DRAWINGS

The above and other aspects, features and advantages of the present disclosure will become more apparent to those of ordinary skill in the art by describing in detail embodiments thereof with reference to the accompanying drawings, in which.

DETAILED DESCRIPTION OF EMBODIMENTS

Figure 1:
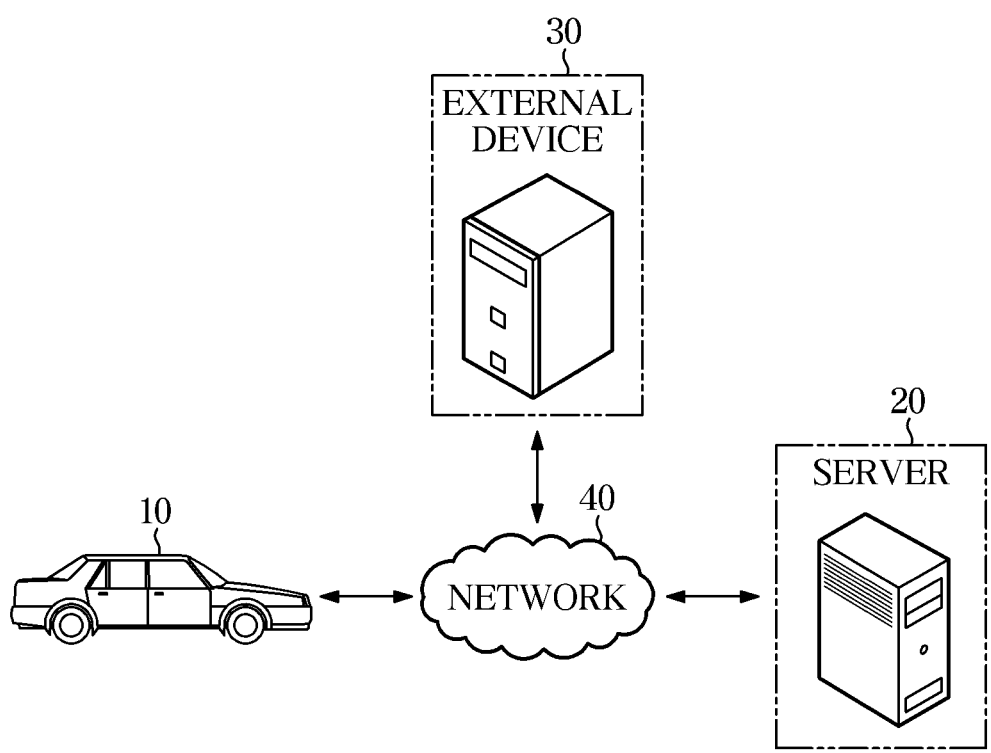
FIG. 1 is a block diagram of a vehicle driving system including a vehicle, a server, and an external device, according to an embodiment of the present disclosure.

Like numerals refer to like elements throughout the specification. Not all elements of embodiments of the present disclosure will be described, and description of what are commonly known in the art or what overlap each other in the embodiments will be omitted.

It will be further understood that the term "connect" or its derivatives refer both to direct and indirect connection, and the indirect connection includes a connection over a wireless communication network.

The term "include (or including)" or "comprise (or comprising)" is inclusive or open-ended and does not exclude additional, unrecited elements or method steps, unless otherwise mentioned.

It is to be understood that the singular forms "a," "an," and "the" include plural references unless the context clearly dictates otherwise.

Furthermore, the terms, such as "~ part", "~ block", "~ member", "~ module", etc., may refer to a unit of handling at least one function or operation. For example, the terms may refer to at least one process handled by hardware such as field-programmable gate array (FPGA)/application specific integrated circuit (ASIC), etc., software stored in a memory, or at least one processor.

Reference numerals used for method steps are just used to identify the respective steps, but not to limit an order of the steps. Thus, unless the context clearly dictates otherwise, the written order may be practiced otherwise.

Embodiments of a vehicle and method for controlling the same will now be described in detail with reference to accompanying drawings.

FIG. 1 is a block diagram of a vehicle driving system including a vehicle 10, a server 20, and an external device 30, according to an embodiment of the present disclosure.

Referring to FIG. 1, the vehicle driving system may include the vehicle 10, the server 20, the external device 30, and a network 40.

The vehicle 10 may be connected to the server 20 over the network 40, and the external device 30 may also be connected to the server 20 over the network 40. For example, the vehicle 10 may be wirelessly connected to the network 40 to communicate with the server 20, and the external device 30 may be wirelessly or wiredly connected to the network 40 to communicate with the server 20.

The wireless communication may include cellular communication using at least one of e.g., Long-Term Evolution (LTE), LTE-Advanced (LTE-A), Code Divisional Multiplexing Access (CDMA), Wideband CDMA (WCDMA), Universal Mobile Telecommunications System (UMTS), Wireless Broadband (WiBro), Global System for Mobile Communications (GSM), etc. In an embodiment, the wireless communication may include at least one of wireless fidelity (Wi-Fi), bluetooth, bluetooth low energy (BLE), zigbee, near field communication (NFC), magnetic secure transmission, radio frequency (RF), and a body area network (BAN). In an embodiment, the wireless communication may include Global Navigation Satellite System (GNSS). The GNSS may include e.g. Global Positioning System (GPS), Global Navigation Satellite System (Glonass), and Beidou Navigation Satellite System (hereinafter, also called "Beidou") or Galileo, the European global satellite-based navigation system.

The wired communication may include at least one of e.g., Universal Serial Bus (USB), High Definition Multimedia Interface (HDMI), Recommended Standard (RS) 232, power line communication, Plain Old Telephone Service (POTS), and the like.

The aforementioned wireless or wired communication is, however, listed by way of example, and there are no limitations on communication schemes as long as they support wireless or wired communication.

The network 40 may include at least one of telecommunication networks, e.g., computer networks (e.g., Local Area Network (LAN) or Wide Area Networks (WAN)), the Internet, and telephone networks.

The external device 30 may be a device arranged outside the vehicle 10, including e.g., an intelligent road terminal device provided on a road on which the vehicle 10 is moving, a traffic light terminal device, and/or other vehicle. There are no limitations on the external device 30 as long as it is provided outside the vehicle 10 to send an operation request for the vehicle 10.

Although a single vehicle 10 is shown in FIG. 1, there may be a plurality of vehicles communicating with the server 20 over the network 40. Each of the components included in the vehicle driving system will now be described in detail.

Figure 2:
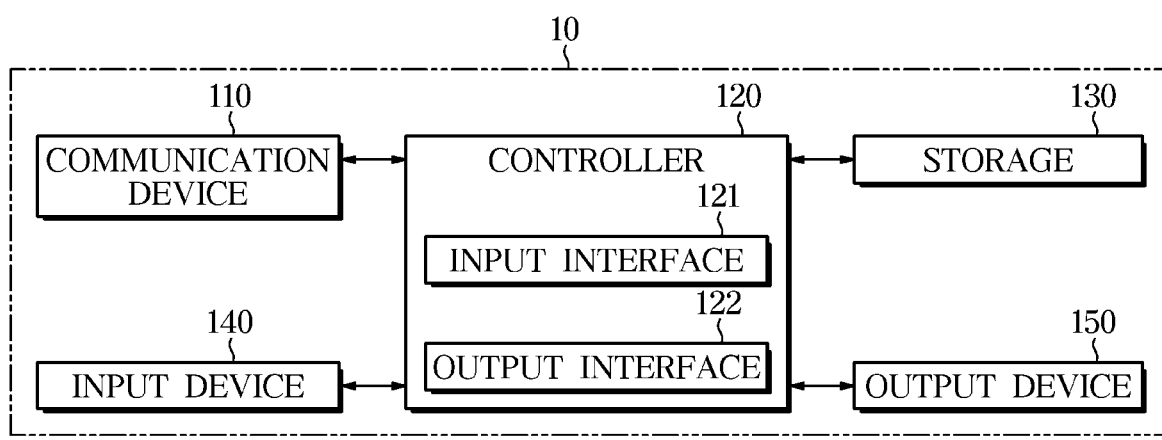
FIG. 2 is a control block diagram of a vehicle, according to an embodiment of the present disclosure.

FIG. 2 is a control block diagram of the vehicle 10, according to an embodiment of the present disclosure.

Referring to FIG. 2, the vehicle 10 may include a communication device 110 for performing communication with the server 20 over the network 40, a controller 120 for controlling the vehicle 10 based on an operation request message received from the server 20, a storage 130 for storing a vehicle identification number allocated to the vehicle 10 and an encryption key corresponding to the vehicle identification number, an input device 140 for receiving an in-vehicle input corresponding to an input made inside the vehicle 10, and at least one output device 150 for performing operations of the vehicle 10.

In an embodiment, the communication device 110 performs communication with the server 20. Specifically, the communication device 110 may receive an operation authentication message including an operation request message from the server 20 and send vehicle driving information of the vehicle 10 to the server 20.

The operation request message may include an input signal to instruct execution of a target operation on the vehicle 10, which may be sent from the external device 30 to the server 20 or may be created by the server 20 itself.

The operation authentication message may correspond to a message including an operation request message having an instruction to execute a target operation authenticated by the server 20 based on the driving condition information of the vehicle 10. The operation authentication message may include the operation request message, an encryption key of the vehicle 10, and priority setting information indicating priority between a new operation request signal corresponding to the operation request message and an existing operation request signal corresponding to an in-vehicle input. This will be described in more detail later.

The driving condition information is a term including information relating driving of the vehicle 10, which may include speed information of the vehicle 10, information about a time zone in which the vehicle 10 is driven, road traffic condition information of a road on which the vehicle 10 is driven, weather condition information at a time when the vehicle 1 is being driven, etc. The aforementioned information is, however, provided by way of example, and there are no limitations on the driving condition information as long as the information relates to driving of the vehicle 10. The driving condition information may be obtained through at least one sensor included in a sensing device arranged in the vehicle 10, or obtained through at least one sensor included in a sensing device arranged in the external device 30.

The communication device 110 may communicate with the server 20 in various methods. For example, the communication device 110 may exchange information with the server 20 using various methods, such as LTE, LTE-A, CDMA, WCDMA, UMTS, WiBro, GSM, etc. The method in which to communicate with the server 20 is not limited thereto, but may be any kind of method that may perform communication with the server 20.

Although the communication device 110 is shown as a single component to transmit and receive signals in FIG. 2, it is not limited thereto, but may be implemented as separate transmitter for transmitting signals and receiver for receiving signals.

In an embodiment, the controller 120 may control the vehicle 10 based on the operation authentication message received from the server 20.

Specifically, in embodiments, the controller 120 may determine whether the encryption key included in the operation authentication message received from the server 20 is identical to an encryption key of the vehicle 10 stored in a storage of the vehicle. However, it is not necessary for the encryption key from the server 20 to be identical to the encryption key stored in the vehicle 10 as discussed below.

This is to determine whether an instruction to execute a target operation, which is included in an operation request message in the received operation authentication message, has been authenticated by the server 20.

The encryption key may be formed to correspond to the vehicle identification number of the vehicle 10, encrypted and issued when the vehicle 10 learns a key fob, and stored in the storage 130.

The vehicle identification number is a binary pin code converted from a chassis number, which is uniquely allocated to the vehicle 10, and may be used as identification information of the vehicle 10.

Accordingly, the encryption key is uniquely allocated to the vehicle 10, having strong security and uniqueness. In an embodiment, the encryption key may correspond to an internal secret key (ISK), without being limited thereto. For example, there are no limitations on the encryption key as long as it is encrypted and allocated uniquely to the vehicle 10.

In an embodiment, the controller 120 may control the communication device 110 to send the vehicle identification information and encryption key of the vehicle 10 stored in advance to the server 20.

Accordingly, the server 20 may have stored the vehicle identification information and encryption key of the vehicle 10, and may indicate that an operation request message for the vehicle 10 has been authenticated by sending a combination of the operation request message for the vehicle 10 and the encryption key of the vehicle 10 to the vehicle 10.

In an embodiment, the controller 120 may generate a new operation request signal corresponding to the operation request message included in the operation authentication message received from the server 20, if the encryption key included in the operation authentication message received from the server 20 is identical to the encryption key of the vehicle 10 stored in advance.

Furthermore, the controller 120 may determine priority between the new operation request signal and at least one existing operation request signal corresponding to at least one in-vehicle input, based on the priority setting information included in the operation authentication message received from the server 20.

The new operation request signal corresponds to an operation request signal corresponding to an operation request message created by the external device 30 or the server 20, which are located outside the vehicle 10. The new operation request signal is to control an operation of the vehicle 10, which is intended by an outside entity.

The existing operation request signal corresponds to an operation request signal corresponding to an in-vehicle input made through the input device 140 arranged inside the vehicle 10, which may not be received from an entity outside the vehicle 10 but may exist beforehand.

The priority setting information may be determined by the server 20 based on the driving condition information of the vehicle 10, and may include priority between the new operation request signal and the at least one existing operation request signal.

In an embodiment, each of the new operation request signal and two or more existing operation signals includes information corresponding a target operation which corresponds to one of the output devices 150 in the vehicle. The controller 120 may control the output device 150 corresponding to a target operation corresponding to one selected among the new operation request signal and the two or more existing operation signals based on the prioritization so that the corresponding output device performs the target operation.

If the new operation request signal is given priority over the at least one existing operation request signal, the controller 120 may control the output device 150 corresponding to the target operation to perform the target operation based on the new operation request signal. In embodiments, if the new operation request signal corresponding to vehicle control intended from the outside takes priority over the existing operation request signal corresponding to vehicle control intended from inside the vehicle, the output device 150 may be controlled based on the new operation request signal for the vehicle 10.

To perform what is described above, the controller 120 may include at least one input interface 121 and at least one output interface 122.

The input interface 121 may receive an input signal corresponding to at least one operation sent from the input device 140, and generate an operation request signal corresponding to the input signal.

Furthermore, the input interface 121 may receive an input signal corresponding to an operation request message received through the communication device 110, and generate an operation request signal corresponding to the input signal.

In embodiments, the controller 120 includes two or more input interfaces. Each of a plurality of operations on the vehicle 10 may correspond to a particular one of the two or more input interfaces 121 included in the controller 120. In embodiments, the particular input interface 121 may receive an input signal about at least one of the plurality of operations on the vehicle 10 and generate an operation request signal corresponding to the input signal.

The output interface 122 may output an instruction to the output device 150 that performs a target operation to perform the target operation based on the operation request signal sent from the input interface 121.

Accordingly, the input interface 121 and output interface 122 may be provided to correspond to a plurality of operations on the vehicle 10. Especially, the vehicle 10 may include the input interface 121 and output interface 122 corresponding to a target operation in the operation request message requested from the outside.

With the configuration, the vehicle 10 may handle the operation request message sent from the outside and perform an operation based on the result.

In an embodiment, the controller 120 may obtain at least one of login information of the target operation from the output device 150 corresponding to the target operation requested in the operation request message and a load condition of the output device 150 corresponding to the target operation.

The controller 120 may determine whether the target operation has been performed based on the at least one of the login information and the load condition.

The login information may correspond to information recording an operating condition of the output device 150 when the output device 150 is operated and information about whether the output device 150 has performed the target operation.

The load condition may correspond to information indicating a condition of the output device 150 and include information indicating whether the output device 150 is in a normal condition or an abnormal condition and/or information indicating whether a short circuit or an open circuit has occurred.

In an embodiment, the controller 120 may control the communication device 110 based on the determination of whether the target operation has been performed to send the server 20 a feedback message indicating whether the target operation has been performed.

The controller 120 may include at least one memory for storing a program for carrying out the aforementioned and following operations, and at least one processor for executing the program. In a case that the memory and the processor are each provided in the plural, they may be integrated in a single chip or physically distributed. In embodiments, the controller 120 includes two or more processors.

In an embodiment, the storage 130 may store a vehicle identification number allocated to the vehicle 10 and an encryption key corresponding to the vehicle identification number.

The vehicle identification number and the encryption key may be set in the manufacturing stage of the vehicle 10 and then stored in the storage 120.

In an embodiment, the storage 130 may store various information for controlling the vehicle 10, and may be implemented with at least one of a non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as hard disk drive (HDD) or compact disk (CD) ROM, without being limited thereto.

In an embodiment, the input device 140 may receive an input made inside the vehicle 10 (also called an in-vehicle input).

Specifically, the input device 140 may include various buttons, a steering wheel, a brake pedal, an accelerator pedal, a transmission lever, a light lever, etc., which are arranged inside the vehicle 10. Accordingly, the input device 140 may receive manual inputs or switch inputs from the user of the vehicle 10.

Furthermore, the input device 140 may include a communication module provided inside the vehicle 10. The communication module may receive the user's remote input to an external terminal device, such as a remote controller. Accordingly, the input device 140 may receive remote inputs to the external terminal device from the user of the vehicle 10.

The communication module may use various communication protocols, e.g., bluetooth, NFC, etc., to communicate with an external terminal device without limitations.

Furthermore, the input device 140 may include a microphone provided inside the vehicle 10. With the microphone, the input device 140 may receive voice inputs from the user of the vehicle 10. In this regard, the controller 120 may use a natural language understanding algorithm stored in advance to generate an operation request signal for a target operation intended by the voice input of the user.

The input device 140 may also receive other function linked inputs from the output device 150 of the vehicle 10. For this, the input device 140 may include a vehicle communication network (NT) module to communicate with the respective components of the vehicle 10.

The car communication network NT may employ a communication protocol, such as Media Oriented Systems Transport (MOST), Flexray, Controller Area Network (CAN), Local Interconnect Network (LIN), etc.

The other function linked input may correspond to an input to request an operation of other output device 150 in response to an operation of a particular output device 150. For example, when the braking system is operated in response to an input applied to the brake pedal, an input to request an operation of the tail lamps may be made through the input device 140.

In an embodiment, the output device 150 may perform an operation of the vehicle 10. For example, the output device 150 may perform an operation of the vehicle 10 based on an operation control instruction sent from the controller 120.

The output device 150 may include a speaker, a display, a fan and compressor of an air conditioner, an engine and motor of a power system, a motor and valve of a braking system, a fan of a wind ventilation system, an opening/ closing system of doors or tailgate, lamps, an Audio Video Navigation (AVN) system, etc.

Specifically, the output device 150 may include the AVN system for outputting music or video in response to an input from the user. Specifically, the AVN system 130 may reproduce music or video, or give directions to the destination in response to an input from the user.

Furthermore, the output device 150 may include an engine control device for performing fuel injection control, fuel economy control, lean burn control, ignition timing control, idle rpm control, and the like. The engine control device may correspond not only to a single device, but also to a plurality of devices connected to one another through communication.

The output device 150 may include a transmission control system for performing shifting point control, damper clutch control, pressure control when the friction clutch is on or off, engine torque control during transmission, and the like. The transmission control system may correspond not only to a single system, but also to a plurality of systems connected to one another through communication.

The output device 150 may include a braking control system for controlling braking of the vehicle 10, and may typically include an Anti-lock Brake System (ABS).

Furthermore, the output device 150 may include a steering control system for controlling steering angles of the vehicle 10 and assisting the driver with steering manipulation by reducing steering force for slow driving or parking and increasing steering force for high-speed driving.

The output device 150 may include a driving assistant system for supporting traveling of the vehicle 10 by performing a forward collision avoidance function, a lane departure warning function, a blind spot monitoring function, rear view monitoring function, etc.

For example, the driving assistant system may include a plurality of devices connected to one another through communication. For example, the driving assistant system may include a Forward Collision Warning System (FCW), an Advanced Emergency Braking System (AEBS), an Adaptive Cruise Control (ACC), a Lane Departure Warning System (LDWS), a Lane Keeping Assist System (LKAS), a Blind Spot Detector (BSD), a Rear-end Collision Warning System (RCW), etc.

Furthermore, the output device 150 may include a lamp control system for performing turning on/off of various lamps included in the vehicle 10 and controlling the brightness.

In addition, the output device 150 may further include an autonomous driving control system for controlling autonomous driving of the vehicle 10.

Figure 3:
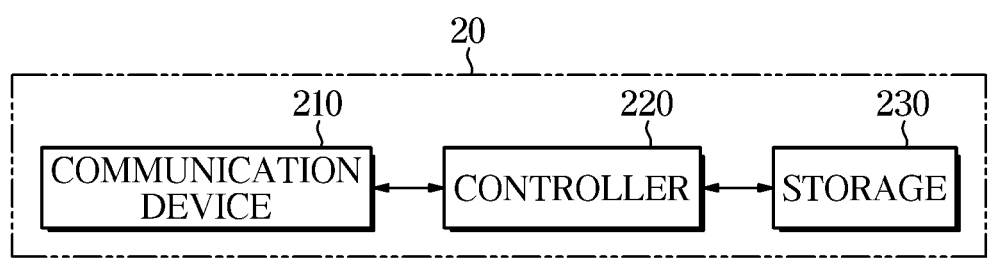
FIG. 3 is a control block diagram of a server, according to an embodiment of the present disclosure.

FIG. 3 is a control block diagram of the server 20, according to an embodiment of the present disclosure.

Referring to FIG. 3, the server 20 may include a communication device 210 for performing communication with the vehicle 10 and the external device 30 over the network 40, a controller 220 for authenticating an instruction to execute a target operation in an operation request message received from the external device 30 or generated by the controller 220 based on driving condition information of the vehicle 10, determining priority setting information corresponding to the operation request message based on the driving condition information of the vehicle 10, and controlling the communication device 210 to send an operation authentication message including the operation request message, an encryption key of the vehicle 10, and the priority setting information to the vehicle 10, and a storage 230 for storing a vehicle identification number and encryption key of the vehicle 10 received from the vehicle 10.

In embodiments, the priority setting information can be used for prioritizing, by the vehicle's controller, the new operation request signal and the at least one operation request signal. In one embodiment, the controller of the vehicle can prioritize based on only the priority setting information from the external server 20. In another embodiment, the controller of the vehicle can prioritize based on the priority setting information from the external server 20 and the other priority setting information stored in the vehicle.

In an embodiment, the communication device 210 may perform communication with the vehicle 10 and the external device 30 over the network 40, Specifically, the communication device 210 may receive an operation request message including an input signal to instruct execution of an operation on the vehicle 10 from the external device 30.

The communication device 210 may also send an operation authentication message including the operation request message received from the external device 30 or generated by itself to the vehicle 10. The operation authentication message may include an encryption key of the vehicle 10 and priority setting information including priority between operation request signals.

Furthermore, the communication device 210 may receive driving condition information of the vehicle 10 from the vehicle 10 or the external device 30. The controller 220 may authenticate the operation request message based on the received driving condition information and determine priority of the operation request message.

The communication device 210 may communicate with the vehicle 10 and the external device 30 in various methods. For example, the communication device 210 may exchange information with the vehicle 10 and the external device 30 using various methods, such as LTE, LTE-A, CDMA, WCDMA, UMTS, WiBro, GSM, etc. The method in which to communicate with the vehicle 10 and the external device 30 is not limited thereto, but may be any kind of method that may perform communication with the vehicle 10 and the external device 30.

Although the communication device 210 is shown as a single component to transmit and receive signals in FIG. 3, it is not limited thereto, but may be implemented as separate transmitter for transmitting signals and receiver for receiving signals.

In an embodiment, upon receiving an operation request message for the vehicle 10 from the external device 30, the controller 220 may authenticate an instruction to execute a target operation in the operation request message based on the driving condition information of the vehicle 10.

Specifically, the controller 220 may authenticate the instruction to execute the target operation in the operation request message based on the driving condition information of the vehicle 10 and pre-stored information about a relation between the driving condition information of the vehicle 10 and the target operation. This will be described in more detail later.

In an embodiment, the controller 220 may determine priority setting information corresponding to the operation request message based on the driving condition information of the vehicle 10.

The priority setting information may include priority between a new operation request signal corresponding to the operation request message and at least one existing operation request signal corresponding to at least one in-vehicle input.

Specifically, the controller 220 may determine the priority setting information based on the driving condition information of the vehicle 10 and the pre-stored information about a relation between the driving condition information of the vehicle 10 and the operation request signal. This will be described in more detail later.

In an embodiment, the controller 220 may control the communication device 210 to send an operation authentication message including the operation request message, an encryption key of the vehicle 10, and the priority setting information to the vehicle 10.

In an embodiment, the controller 220 may generate the operation request message for the vehicle 10 by itself based on the driving condition information of the vehicle 10.

In an embodiment, upon receiving a feedback message indicating whether the target operation in the operation request message has been performed from the vehicle 10, the controller 220 may determine whether to resend the operation authentication message based on the feedback message.

In embodiments, if a target operation requested in the operation request message included in the operation authentication message has not been performed in the vehicle 10 even though the operation authentication message was sent to the vehicle 10, the controller 220 may resend the operation authentication message to the vehicle 10.

Furthermore, if reception of the feedback message is failed for a predetermined period of time, the controller 220 may control the communication device 210 to resend the operation authentication message.

The controller 220 may include at least one memory for storing a program for carrying out the aforementioned and following operations, and at least one processor for executing the program. In a case that the memory and the processor are each provided in the plural, they may be integrated in a single chip or physically distributed. In embodiments, the controller includes two or more processors.

In an embodiment, the storage 230 may store a vehicle identification number and encryption key of the vehicle 10 from the vehicle 10.

Furthermore, in an embodiment, the storage 230 may store information indicating a relation between the driving condition information and a target operation and relation information between operation request signals according to driving condition information.

In an embodiment, the storage 230 may store various information required to control the server 20, and may be implemented with at least one of a non-volatile memory device, such as cache, ROM, PROM, EPROM, EEPROM, a volatile memory device, such as RAM, or a storage medium, such as HDD or CD-ROM, without being limited thereto.

Figure 4:
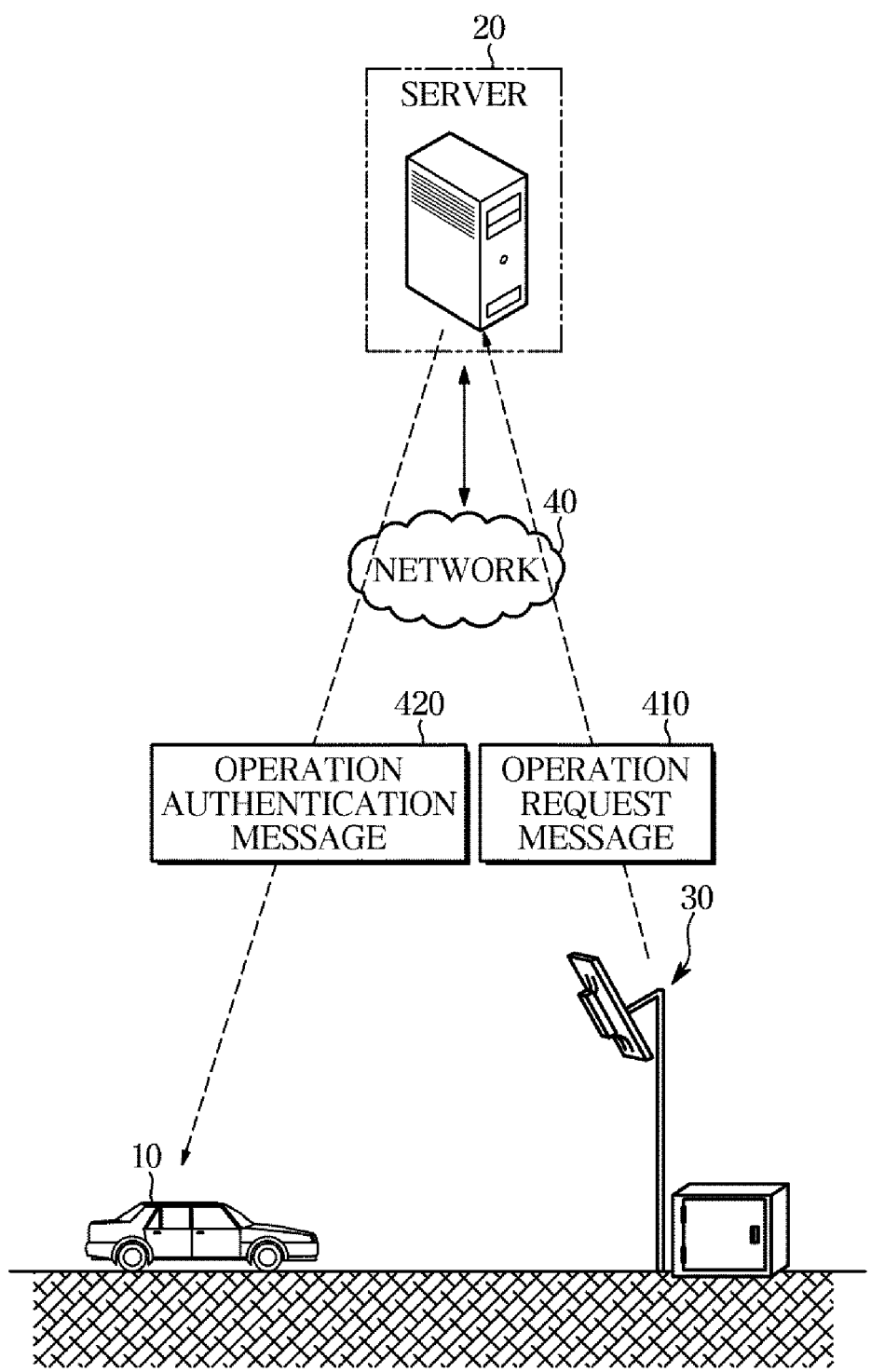
FIG. 4 shows an occasion when a vehicle receives an operation authentication message from a server while being driven, according to an embodiment of the present disclosure.
Figure 5:
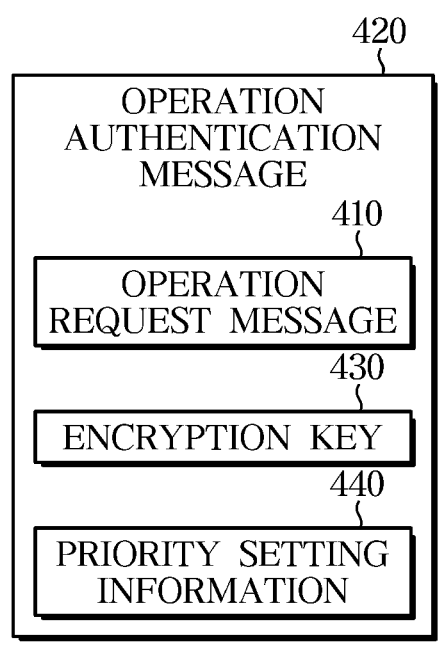
FIG. 5 shows an operation authentication message, according to an embodiment of the present disclosure.

FIG. 4 shows an occasion when the vehicle 10 receives an operation authentication message 420 from the server 20 while being driven, according to an embodiment of the present disclosure, and FIG. 5 shows the operation authentication message 420, according to an embodiment of the present disclosure.

Referring to FIG. 4, the vehicle 10 may receive the operation authentication message 420 from the server 20 while being driven.

Specifically, in an embodiment, upon receiving an operation request message 410 from the external device 30, the server 20 may authenticate an instruction to execute a target operation requested in the operation request message 410 and send the operation authentication message 420 including the authenticated operation request message 410 and an encryption key 430 of the vehicle 10 to the vehicle 10.

In an embodiment, upon receiving the operation request message 410 for the vehicle 10 from the external device 30, the controller 220 of the server 20 may authenticate an instruction to execute a target operation in the operation request message 410 based on driving condition information of the vehicle 10.

The operation request message 410 received from the external device 30 may include information about a chassis number of the vehicle 10 obtained by e.g., a capturing device provided in the external device 30.

The controller of the server 20 may then verify the vehicle identification number corresponding to the chassis number of the vehicle 10 based on vehicle identification number stored in the storage 230 and determine that the received operation request message 410 is for the vehicle 10.

Furthermore, the controller 220 may authenticate the instruction to execute the target operation in the operation request message 410 based on the driving condition information of the vehicle 10 and the pre-stored information about a relation between the driving condition information of the vehicle 10 and the target operation.

For example, the information about a relation between the driving condition information of the vehicle 10 and the target operation may indicate that the target operation, e.g., to turn on the lamp of the vehicle 10, is suitable when the driving time zone indicated by the driving condition information of the vehicle 10 corresponds to night time.

In embodiments, the information about a relation between the driving condition information of the vehicle 10 and the target operation may include information indicating whether the target operation is suitable under a driving condition indicated by the driving condition information.

In another embodiment, however, the server 20 may generate the operation request message 410 requesting a target operation by itself based on the driving condition information of the vehicle 10.

In an embodiment, when authenticating an instruction to execute the target operation requested in the operation request message 410, the controller 220 of the server 20 may determine priority setting information 440 corresponding to the operation request message 410.

The priority setting information 440 may include priority between a new operation request signal corresponding to the operation request message 410 and at least one existing operation request signal corresponding to at least one in-vehicle input.

Specifically, the controller 220 may determine the priority setting information 440 based on the driving condition information of the vehicle 10 and the pre-stored information about a relation between the driving condition information of the vehicle 10 and the operation request signal.

For example, the information about a relation between the driving condition information of the vehicle 10 and the operation request signal may indicate that a new operation request signal, e.g., to turn on the lamp of the vehicle 10, takes priority over the existing operation request signal corresponding to an in-vehicle input when the driving condition information of the vehicle 10 indicates a driving time zone of the vehicle 10 corresponding to night time.

In embodiments, the information about a relation between the driving condition information of the vehicle 10 and the target operation may include information about priority between the new operation request signal and the existing operation request signal under a driving condition indicated by the driving condition information.

Referring to FIG. 5, in an embodiment, once determining the priority setting information 440 corresponding to the operation request message 410, the controller 220 of the server 20 may create the operation authentication message 420 to include the operation request message 410, the encryption key 430 of the vehicle 10, and the priority setting information 440 corresponding to the operation request message 410.

Furthermore, the controller 220 may control the communication device 230 to send the operation authentication message 420 to the vehicle 10.

Upon receiving the operation authentication message 420 including the encryption key 430, which is identical to an encryption key of the vehicle 10, the controller 120 of the vehicle 10 may determine that an instruction to execute the target operation requested in the operation request message 410 included in the operation authentication message 420 has been authenticated.

Furthermore, the controller 120 of the vehicle 10 may control the output device 150 of the vehicle 10 based on the operation authentication message 420 received from the server 20. How the controller 120 controls the output device 150 of the vehicle 10 based on the operation authentication message 420 will now be described in detail.

Figure 6:
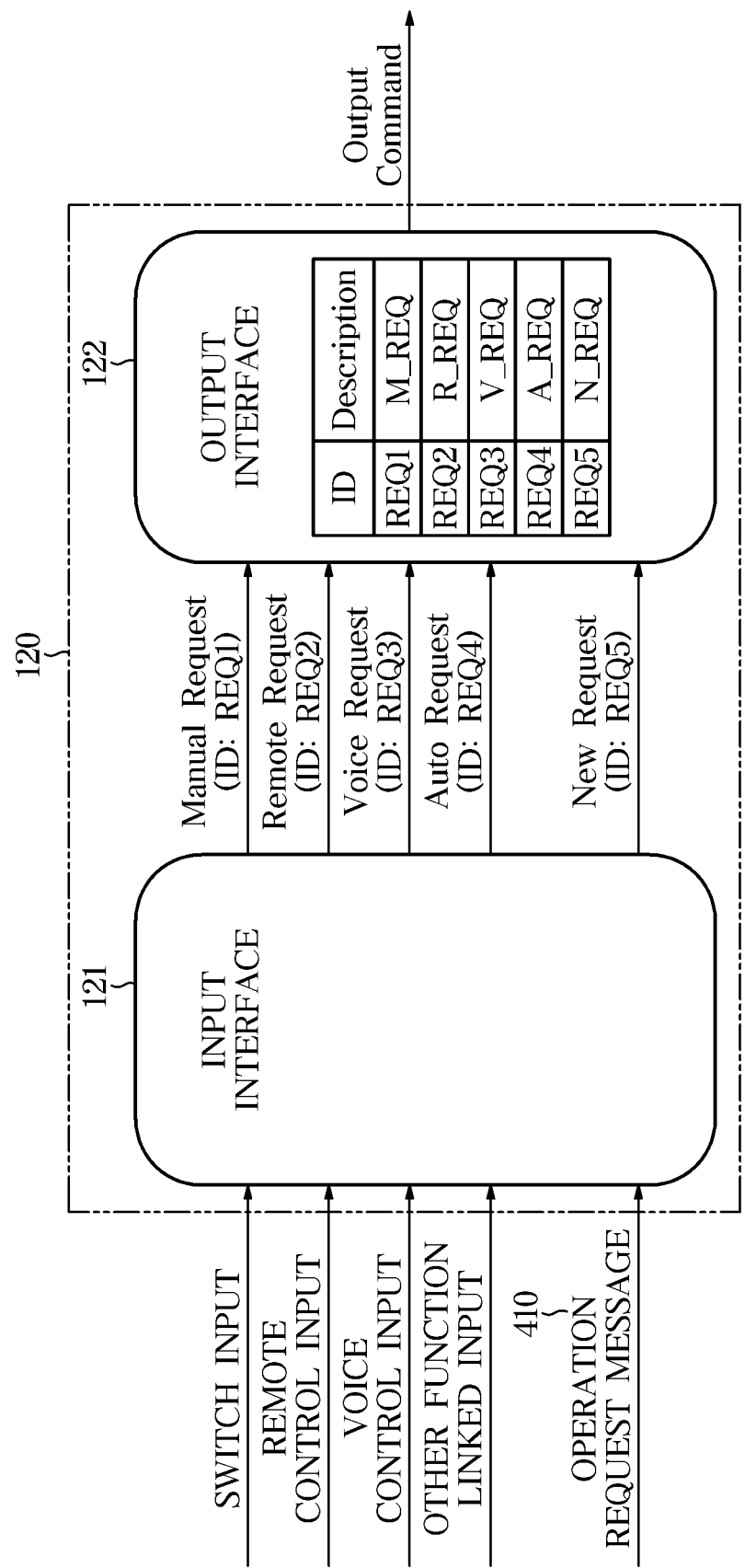
FIG. 6 shows a controller handling an operation request message, according to an embodiment of the present disclosure.
Figure 7:
FIG. 7 shows tables for explaining determination of priority between operation request signals based on priority setting information, according to an embodiment of the present disclosure.

FIG. 6 shows the controller 120 of the vehicle 10 handling the operation request message 410, according to an embodiment of the present disclosure, and FIG. 7 shows tables for explaining determination of priority between operation request signals based on the priority setting information 440, according to an embodiment of the present disclosure.

Referring to FIG. 6, the communication device 110 of the vehicle 10 may receive the operation authentication message 420 from the server 20.

In an embodiment, the controller 120 of the vehicle 10 may determine the input interface 121 corresponding to a target operation requested in the operation request message 410 included in the operation authentication message 420 if the encryption key 430 included in the operation authentication message 420 is identical to the encryption key of the vehicle 10.

For example, the controller 120 may receive an input signal about the target operation requested in the operation request message 410 and determine one of at least one input interface 121 included in the controller 120 that creates the operation request signal corresponding to the input signal.

The input interface 121 may create the operation request signal based on the operation request message 410 corresponding to an in-vehicle input from the user through the input device 140 or an external input received through the communication device 110.

Specifically, the input interface 121 may create the respective existing operation request signals corresponding to a switch input, a remote control input, a voice control input, and other function linked input, which are in-vehicle inputs from the user through the input device 140.

The switch input may refer to a user's input made on various buttons, the steering wheel, the brake pedal, the accelerator pedal, the transmission lever, the light lever, etc., included in the input device 140, and the input interface 121 may generate an existing operation signal corresponding to the switch input (Manual Request).

The remote control input may refer to a remote input received from an external terminal device, such as a remote control, through the communication module included in the input device 140, and the input interface 121 may generate an existing operation signal corresponding to the remote control input (Remote Request).

The voice control input may correspond to the user's voice input received through a microphone included in the input device 140, and the input interface 121 may generate an existing operation signal corresponding to the voice control input (Voice Request) using a natural language understanding algorithm.

The other function linked input may correspond to an input received from the particular output device 150 to the input device 140 to request an operation linked to operation of the particular output device 150 that operates based on the user's input received through the input device 140, and the input interface 121 may generate an existing operation request signal corresponding to the other function linked input (Auto Request).

Furthermore, in an embodiment, the input interface 121 of the controller 120 may generate a new operation request (New Request) corresponding to the operation request message 410, which is included in the operation authentication message 420 received through the communication device 110, corresponding to an input from outside of the vehicle 10.

The input interface 121 may send the existing operation request signal and the new operation request signal to an output interface 122 corresponding to the target operation. In this regard, the output interface 122 of the controller 120 may determine priority between the new operation request signal and the existing operation request signal based on the priority setting information 440 included in the operation authentication message 420 received from the server 20.

The new operation request signal corresponds to an operation request signal corresponding to the operation request message 410 created by the external device 30 or the server 20, which are located outside the vehicle 10. The new operation request signal is to control an operation of the vehicle 10, which is intended by an outside entity.

The existing operation request signal may correspond to an operation request signal corresponding to an in-vehicle input made through the input device 140 arranged inside the vehicle 10, which may not be received from an entity outside the vehicle 10 but may exist beforehand.

The priority setting information 440 may be determined by the server 20 based on the driving condition information of the vehicle 10, and may include priority between the new operation request signal and the existing operation request signal.

Specifically, the priority setting information 440 may include priorities of the IDs allocated to the respective operation request signals.

For example, if the priority setting information 440 indicates that the new operation request signal ID (REQ5) takes priority over the existing operation request signals (REQ1, REQ2, REQ3, and REQ4), the output interface 121 of the controller 120 may update the priority between the operation request signals to indicate that the new operation request signal has the highest priority, as shown in FIG. 7.

In the embodiment, in which the new operation request signal is given priority over the at least one existing operation request signal, the output interface 122 of the controller 120 may control the output device 150 corresponding to the target operation to perform the target operation based on the new operation request signal.

In embodiments, if the new operation request signal corresponding to vehicle control intended from the outside takes priority over the existing operation request signal corresponding to vehicle control intended from inside the vehicle, the output device 150 may be controlled based on the new operation request signal for the vehicle 10.

For example, when the vehicle 10 is driven at night and a new operation request signal corresponding to the operation request message 410 is received through the communication device 110 to turn on a lamp of the vehicle 10 while there is an existing operation request signal corresponding to the user's input through the light lever, which corresponds to the input device 140, to turn off the lamp of the vehicle 10, the controller 120 may control a lamp control device corresponding to the target operation to turn on the lamp based on the new operation request signal having high priority.

However, it is not always the case that the priority setting information 440 indicates that the new operation request signal takes priority over the existing operation request signal, and some of the existing operation request signals may be given priority over the new operation request signal based on the driving condition information of the vehicle 10.

For example, the output interface 122 may send the output device 150 an instruction signal (Output Command) corresponding to a target operation to perform the target operation based on an operation request signal having the highest priority.

In embodiments, the controller 120 may control the output device 150 corresponding to the target operation to perform the target operation based on the determined priority.

A control method of the vehicle 10 and a control method of the server 20 in accordance with an embodiment will now be described. The vehicle 10 and server 20 in accordance with aforementioned embodiments may be applied in describing the control method of the vehicle 10 and the control method of the server 20. What are described above with reference to FIGS. 1 to 7 may also be equally applied in the control method of the vehicle 10 and the control method of the server 20 without being specifically mentioned.

Figure 8:
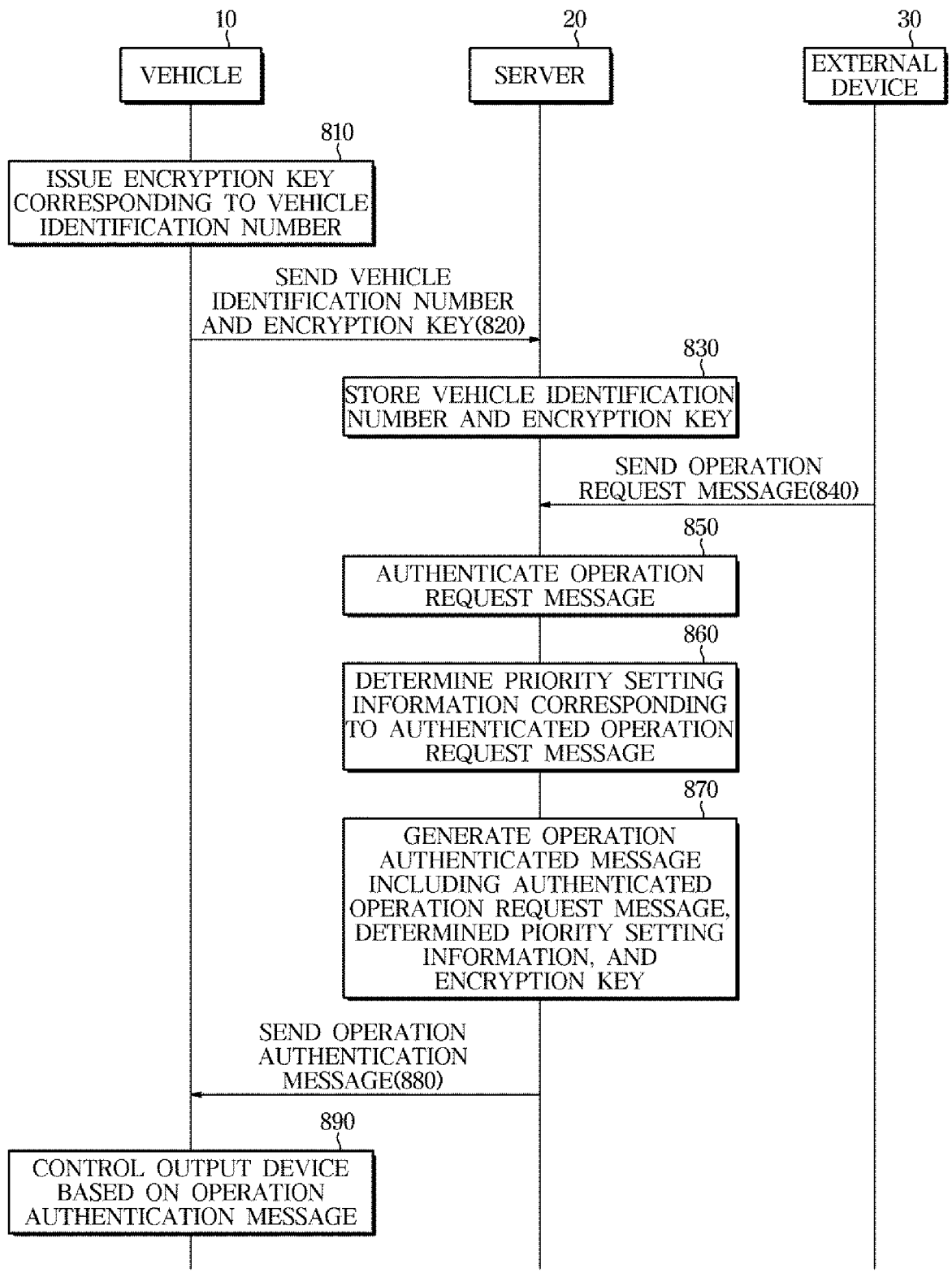
FIG. 8 is a sequential chart of handling an operation request message from an external device in a control method of a vehicle and server, according to an embodiment of the present disclosure.

FIG. 8 is a sequential chart of handling the operation request message 410 from the external device 30 in a control method of the vehicle 10 and the server 20, according to an embodiment of the present disclosure.

Referring to FIG. 8, in an embodiment, the vehicle 10 issues an encryption key corresponding to the vehicle identification number, in 810.

The encryption key may be formed to correspond to the vehicle identification number of the vehicle 10, encrypted and issued when the vehicle 10 learns a key fob, and stored in the storage 130.

The vehicle identification number is a binary pin code converted from a chassis number, which is uniquely allocated to the vehicle 10 and may be used as identification information of the vehicle 10.

Accordingly, the encryption key is uniquely allocated to the vehicle 10 and has strong security and uniqueness. In an embodiment, the encryption key may correspond to an internal secret key (ISK), without being limited thereto. There are no limitations on the encryption key as long as it is encrypted and allocated uniquely to the vehicle 10.

In an embodiment, the vehicle 10 sends the vehicle identification information and the encryption key to the server 20, in 820.

The server 20 then stores the vehicle identification information and the encryption key, in 830. Accordingly, the server 20 may have stored the vehicle identification information and encryption key of the vehicle 10, and may indicate that the operation request message 410 for the vehicle 10 is authenticated by sending a combination of the operation request message 410 for the vehicle 10 and the encryption key of the vehicle 10 to the vehicle 10.

In an embodiment, the external device 30 sends the operation request message 410 to the server 20, in 840. The external device 30 may generate the operation request message 410 based on driving condition information of the vehicle 10, and the operation request message 410 may include an input signal to instruct execution of a target operation on the vehicle 10.

In an embodiment, the server 20 may authenticate the operation request message 410.

Specifically, in an embodiment, upon receiving the operation request message 410 from the external device 30, the server 20 may authenticate an instruction to execute a target operation requested in the operation request message 410 and send the operation authentication message 420 including the authenticated operation request message 410 and the encryption key 430 of the vehicle 10 to the vehicle 10.

In an embodiment, upon receiving the operation request message 410 for the vehicle 10 from the external device 30, the controller 220 of the server 20 may authenticate an instruction to execute a target operation in the operation request message 410 based on driving condition information of the vehicle 10.

The operation request message 410 received from the external device 30 may include information about a chassis number of the vehicle 10 obtained by e.g., a capturing device provided in the external device 30.

The controller of the server 20 may then verify the vehicle identification number corresponding to the chassis number of the vehicle 10 based on vehicle identification number stored in the storage 230 and determine that the received operation request message 410 is for the vehicle 10.

Furthermore, the controller 220 may authenticate the instruction to execute the target operation in the operation request message 410 based on the driving condition information of the vehicle 10 and the pre-stored information about a relation between the driving condition information of the vehicle 10 and the target operation.

For example, the information about a relation between the driving condition information of the vehicle 10 and the target operation may indicate that the target operation, e.g., to turn on the lamp of the vehicle 10, is suitable when the driving time zone indicated by the driving condition information of the vehicle 10 corresponds to night time.

In embodiments, the information about a relation between the driving condition information of the vehicle 10 and the target operation may include information indicating whether the target operation is suitable under a driving condition indicated by the driving condition information.

In another embodiment, however, the server 20 may generate the operation request message 410 requesting a target operation by itself based on the driving condition information of the vehicle 10.

In an embodiment, when authenticating an instruction to execute the target operation requested in the operation request message 410, the controller 220 of the server 20 determines the priority setting information 440 corresponding to the authenticated operation request message 410, in 860.

The priority setting information 440 may include priority between a new operation request signal corresponding to the operation request message 410 and at least one existing operation request signal corresponding to at least one in-vehicle input.

Specifically, the controller 220 may determine the priority setting information 440 based on the driving condition information of the vehicle 10 and the pre-stored information about a relation between the driving condition information of the vehicle 10 and the operation request signal.

For example, the information about a relation between the driving condition information of the vehicle 10 and the operation request signal may indicate that a new operation request signal, e.g., to turn on the lamp of the vehicle 10, takes priority over the existing operation request signal corresponding to an in-vehicle input when the driving condition information of the vehicle 10 indicates a driving time zone of the vehicle 10 corresponding to night time.

In embodiments, the information about a relation between the driving condition information of the vehicle 10 and the target operation may include information about priority between the new operation request signal and the existing operation request signal under a driving condition indicated by the driving condition information.

In an embodiment, the server 20 creates the operation authentication message 420 to include the authenticated operation request message 410, the priority setting information 440, and the encryption key 430, in 870.

Specifically, once determining the priority setting information 440 corresponding to the operation request message 410, the controller 220 of the server 20 may create the operation authentication message 420 to include the operation request message 410, the encryption key 430 of the vehicle 10, and the priority setting information 440 corresponding to the operation request message 410.

Furthermore, in an embodiment, the server 20 sends the operation authentication message 420, in 880. Specifically, the controller 220 of the server 20 may control the communication device 230 to send the operation authentication message 420 to the vehicle 10.

Upon receiving the operation authentication message 420 including the encryption key 430, which is identical to an encryption key of the vehicle 10, the controller 120 of the vehicle 10 may determine that an instruction to execute the target operation requested in the operation request message 410 included in the operation authentication message 420 has been authenticated.

In an embodiment, the vehicle 10 controls the output device 150 based on the operation authentication message 420, in 890. Specifically, the controller 120 of the vehicle 10 may control the output device 150 of the vehicle 10 based on the operation authentication message 420 received from the server 20.

Figure 9:
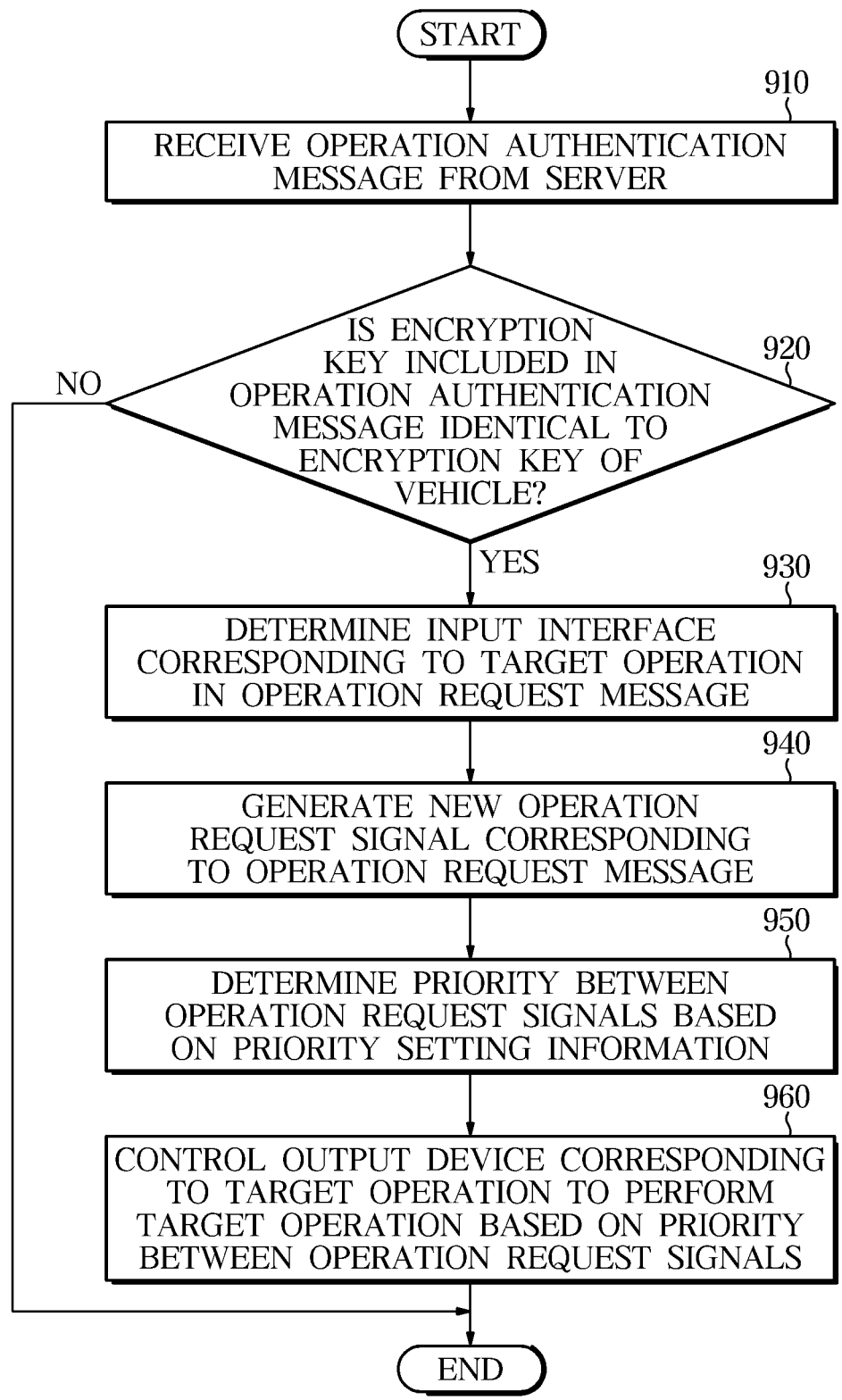
FIG. 9 is a flowchart of controlling a vehicle based on an operation authentication message in a control method of a vehicle, according to an embodiment of the present disclosure.

FIG. 9 is a flowchart of controlling the vehicle 10 based on the operation authentication message 420 in a control method of the vehicle 10, according to an embodiment of the present disclosure.

Referring to FIG. 9, the communication device 110 of the vehicle 10 receives the operation authentication message 420 from the server 20, in 910.

In an embodiment, if the encryption key 430 included in the operation authentication message 420 is identical to the encryption key of the vehicle 10 in 920, the controller 120 of the vehicle 10 determines the input interface 121 corresponding to a target operation requested in the operation request message 410 in 930.

For example, the controller 120 may receive an input signal about the target operation requested in the operation request message 410 and determine one of at least one input interface 121 included in the controller 120 that creates the operation request signal corresponding to the input signal.

The input interface 121 may create the operation request signal based on the operation request message 410 corresponding to an in-vehicle input from the user through the input device 140 or an external input received through the communication device 110.

Specifically, the input interface 121 may create the respective existing operation request signals corresponding to a switch input, a remote control input, a voice control input, and other function linked input, which are in-vehicle inputs from the user through the input device 140.

Furthermore, in an embodiment, the input interface 121 of the controller 120 generates a new operation request signal corresponding to the operation request message 410, in 940.

Specifically, the input interface 121 of the controller 120 may generate a new operation request signal (New Request) corresponding to the operation request message 410, which is included in the operation authentication message 420 received through the communication device 110 and corresponds to an input from outside of the vehicle 10.

The input interface 121 may send the existing operation request signal and the new operation request signal to an output interface 122 corresponding to the target operation.

In this regard, the output interface 122 of the controller 120 determines priority between operation request signals based on the priority setting information 440, in 950.

Specifically, the output interface 122 may determine priority between the new operation request signal and the existing operation request signal based on the priority setting information 440 included in the operation authentication message 420 received from the server 20.

The new operation request signal corresponds to an operation request signal corresponding to the operation request message 410 created by the external device 30 or the server 20, which are located outside the vehicle 10. The new operation request signal is to control an operation of the vehicle 10, which is intended by an outside entity.

The existing operation request signal may correspond to an operation request signal corresponding to an in-vehicle input obtained through the input device 140 arranged inside the vehicle 10, which may not be received from an entity outside the vehicle 10 but may exist beforehand.

The priority setting information 440 may be determined by the server 20 based on the driving condition information of the vehicle 10, and may include priority between the new operation request signal and the existing operation request signal.

Specifically, the priority setting information 440 may include priorities of the IDs allocated to the respective operation request signals.

For example, if the priority setting information 440 indicates that the new operation request signal ID (REQ5) takes priority over the existing operation request signals (REQ1, REQ2, REQ3, and REQ4), the output interface 121 of the controller 120 may update the priority between the operation request signals to indicate that the new operation request signal has the highest priority.

In an embodiment, the output interface 122 of the controller 120 controls the output device 150 corresponding to a target operation to perform the target operation based on the priority between the operation request signals, in 960.

For example, if the new operation request signal is given priority over the at least one existing operation request signal, the output interface 122 of the controller 120 may control the output device 150 corresponding to the target operation to perform the target operation based on the new operation request signal.

In embodiments, if the new operation request signal corresponding to vehicle control intended from the outside takes priority over the existing operation request signal corresponding to vehicle control intended from inside the vehicle, the output device 150 may be controlled based on the new operation request signal for the vehicle 10.

For example, when the vehicle 10 is driven at night and a new operation request signal corresponding to the operation request message 410 is received through the communication device 110 to turn on a lamp of the vehicle 10 while there is an existing operation request signal corresponding to the user's input through the light lever, which corresponds to the input device 140, to turn off the lamp of the vehicle 10, the controller 120 may control a lamp control device corresponding to the target operation to turn on the lamp based on the new operation request signal having high priority.

However, it is not always the case that the priority setting information 440 indicates that the new operation request signal takes priority over the existing operation request signal, and some of the existing operation request signals may be given priority over the new operation request signal based on the driving condition information of the vehicle 10.

For example, the output interface 122 may send the output device 150 an instruction signal (Output Command) corresponding to a target operation to perform the target operation based on an operation request signal having the highest priority.

Figure 10:
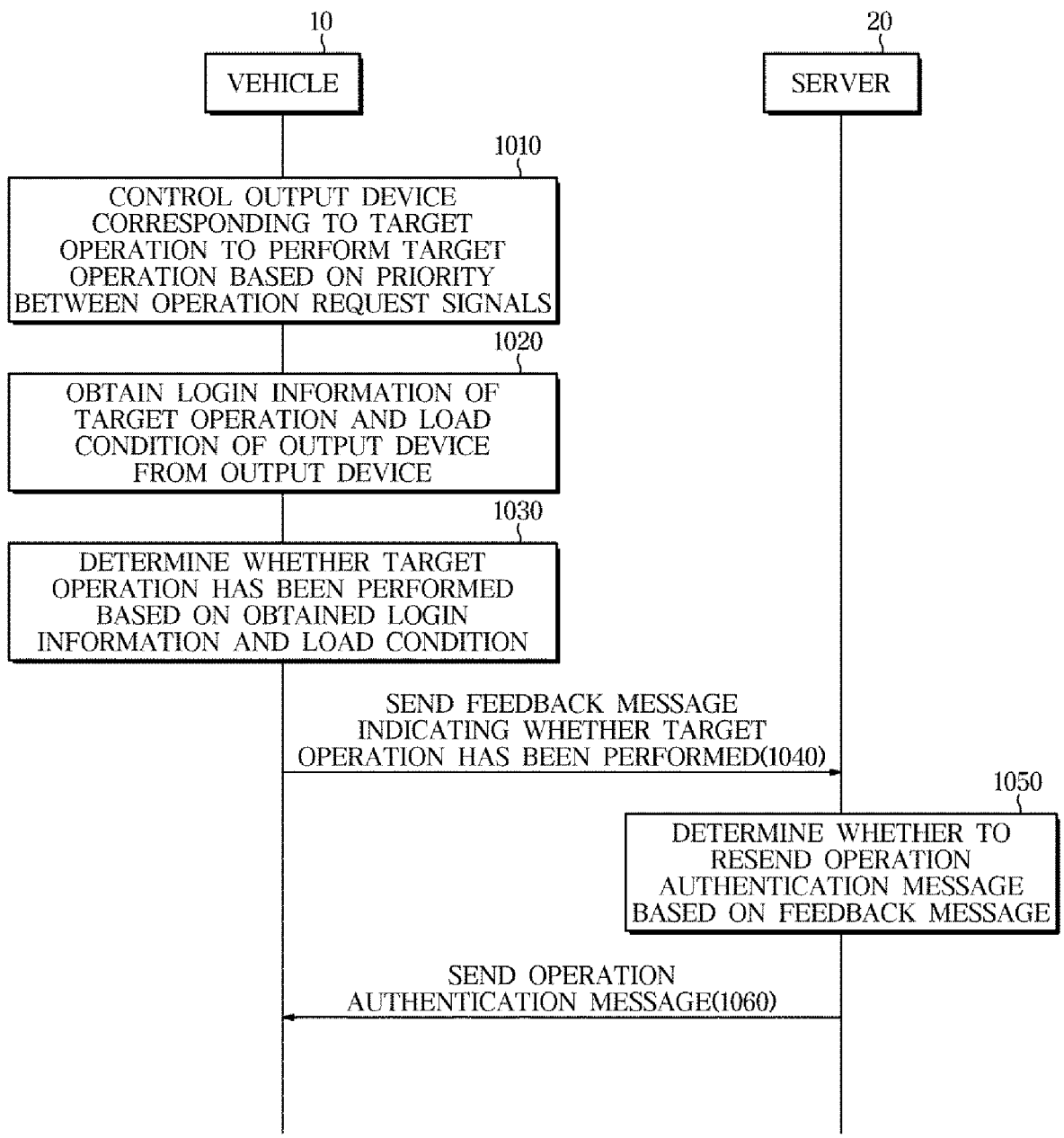
FIG. 10 is a sequential chart of sending a feedback message indicating whether a target operation has been performed in a control method of a vehicle and server, according to an embodiment of the present disclosure.

FIG. 10 is a sequential chart of sending a feedback message indicating whether a target operation is performed in a control method of the vehicle 10 and the server 20, according to an embodiment of the present disclosure.

Referring to FIG. 10, in an embodiment, the controller 120 of the vehicle 10 controls the output device 150 corresponding to a target operation to perform the target operation based on the priority between the operation request signals, in 1010.

In an embodiment, the controller 120 obtains login information of the target operation from the output device 150 and a load condition of the output device 150, in 1020.

In an embodiment, the controller 120 determines whether the target operation has been performed based on the obtained login information and the load condition.

The controller 120 may determine whether the target operation has been performed based on the at least one of the login information and the load condition.

The login information may correspond to information recording an operating condition of the output device 150 when the output device 150 is operated and information about whether the output device 150 has performed the target operation.

The load condition may correspond to information indicating a condition of the output device 150 and include information indicating whether the output device 150 is in a normal condition or an abnormal condition and/or information indicating whether a short circuit or an open circuit has occurred.

In an embodiment, the communication device 110 of the vehicle 10 sends the server 20 a feedback message indicating whether the target operation has been performed, in 1040.

In an embodiment, upon receiving the feedback message indicating whether the target operation in the operation request message 410 has been performed from the vehicle 10, the controller 220 of the server 20 determines whether to resend the operation authentication message 420 based on the feedback message, in 1050.

Accordingly, if the target operation requested in the operation request message 410 included in the operation authentication message 420 has not been performed in the vehicle 10 even though the operation authentication message 420 was sent to the vehicle 10, the controller 220 resends the operation authentication message 420 to the vehicle 10, in 1060.

Furthermore, if reception of the feedback message is failed for a predetermined period of time, the controller 220 may control the communication device 210 to resend the operation authentication message 420.

According to embodiments of the present disclosure, a server and vehicle may determine reliability of a new operation request for the vehicle from an external device and respond to the new operation request in real time by arbitrating priority between the new operation request and an operation request made inside the vehicle.

Meanwhile, the embodiments of the present disclosure may be implemented in the form of recording media for storing instructions to be carried out by a computer. The instructions may be stored in the form of program codes, and when executed by a processor, may generate program modules to perform operation in the embodiments of the present disclosure. The recording media may correspond to computer-readable recording media.

The computer-readable recording medium includes any type of recording medium having data stored thereon that may be thereafter read by a computer. For example, it may be a ROM, a RAM, a magnetic tape, a magnetic disk, a flash memory, an optical data storage device, etc.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The embodiments of the present disclosure have thus far been described with reference to accompanying drawings. It will be obvious to people of ordinary skill in the art that the present disclosure may be practiced in other forms than the embodiments as described above without changing the technical idea or essential features of the present disclosure. The above embodiments are only by way of example, and should not be interpreted in a limited sense.

Several embodiments have been described above, but a person of ordinary skill in the art will understand and appreciate that various modifications can be made without departing the scope of the present disclosure. Thus, it will be apparent to those ordinary skilled in the art that the true scope of technical protection is only defined by the following claims.

What is claimed is:

1. A vehicle comprising:
a plurality of output devices;
an in-vehicle input configured to receive at least one in-vehicle input from a user;
a communication circuitry configured to receive an operation authentication message including an operation request message, encrypted identifier, and priority setting information from an external server; and
at least one processor configured to:
generate a new operation request corresponding to the operation request message when the encrypted identifier from the external server is identical to an encrypted identifier stored in a memory of the vehicle, determine priority between the new operation request and at least one existing operation request corresponding to the at least one in-vehicle input based on the priority setting information, determine, as a target operation, an operation corresponding to a highest priority operation request among the new operation request and the at least one existing operation request, and control a first output device capable of performing the target operation among the plurality of output devices to perform the target operation, wherein the priority setting information represents priority between the new operation request and the at least one existing operation request corresponding to the at least one in-vehicle input, wherein the operation request message comprises an execution command for the target operation and is authenticated by the external server based on driving condition information of the vehicle and pre-stored information about a relationship between the driving condition information of the vehicle and the target operation, and wherein the pre-stored information about the relationship between the driving condition information of the vehicle and the target operation indicates that a target operation of turning on a lamp of the vehicle is executable when a driving time zone indicated by the driving condition information of the vehicle corresponds to night time.

2. The vehicle of claim 1, wherein the at least one processor is configured to control the communication circuitry to transmit, to the external server, a vehicle identification number and the encrypted identifier.

3. The vehicle of claim 1, wherein the priority setting information is generated by the external server based on driving condition information of the vehicle.

4. The vehicle of claim 1, wherein the at least one processor is configured to control the first output device to perform the target operation based on the new operation request, when the new operation request takes priority over the at least one existing operation request.

5. The vehicle of claim 1, wherein the at least one processor comprises a plurality of input interfaces configured to receive an execution command for an operation of the vehicle and to generate an operation request corresponding to the execution command, and wherein the at least one processor is configured to determine a first interface corresponding to an operation of the operation request message among the plurality of input interfaces and control the first input interface to generate a new operation request.

6. The vehicle of claim 1, wherein the controller at least one processor is configured to:

obtain at least one of operation condition information of the target operation or device condition information of the first output device from the first output device, determine whether the target operation has been performed based on the at least one of the operation condition information or the device condition information, and control the communication circuitry to transmit, to the external server, a feedback message indicating whether the target operation has been performed.

7. A server comprising:
a communication circuitry;
a memory configured to store a vehicle identification number received from a vehicle and an encrypted identifier received from the vehicle; and
at least one processor configured to:
authenticate an execution command for a target operation in an operation request message for the vehicle based on driving condition information of the vehicle when receiving the operation request message from an external device or generating the operation request message based on the driving condition information, determine priority setting information corresponding to the operation request message based on the driving condition information, and control the communication circuitry to transmit an operation authentication message including the operation request message, the encrypted identifier, and the priority setting information to the vehicle, wherein the priority setting information represents priority between a new operation request corresponding to the operation request message and at least one existing operation request corresponding to at least one in-vehicle input, wherein the operation request message comprises the execution command for the target operation and is authenticated by the external server based on driving condition information of the vehicle and pre-stored information about a relationship between the driving condition information of the vehicle and the target operation, and wherein the pre-stored information about the relationship between the driving condition information of the vehicle and the target operation indicates that a target operation of turning on a lamp of the vehicle is executable when a driving time zone indicated by the driving condition information of the vehicle corresponds to night time.

8. The server of claim 7, wherein the at least one processor is configured to authenticate the execution command of the target operation in the operation request message based on the driving condition information of the vehicle and the pre-stored information about the relationship between the driving condition information of the vehicle and the target operation.

9. The server of claim 7, wherein the at least one processor is configured to determine the priority setting information based on the driving condition information of the vehicle and the pre-stored information about the relationship between the driving condition information of the vehicle and the target operation.

10. The server of claim 7, wherein the at least one processor is configured to determine whether to resend the operation authentication message based on a feedback message indicating whether the target operation has been performed when receiving the feedback message from the vehicle.

11. The server of claim 7, wherein the at least one processor is configured to control the communication circuitry to resend the operation authentication message when failing to receive a feedback message, indicating whether the target operation has been performed, for a predetermined period of time.

12. A method of controlling a vehicle including a plurality of output devices, an in-vehicle input device configured to receive at least one in-vehicle input from a user, and a communication circuitry, the method comprising:

receiving an operation authentication message including an operation request message, an encrypted identifier, and priority setting information from an external server;
generating a new operation request corresponding to the operation request message when the encrypted identifier from the external server is identical to an encrypted identifier stored in a memory of the vehicle;
determining priority between the new operation request and at least one existing operation request corresponding to the at least one in-vehicle input based on the priority setting information;
determining, as a target operation, an operation corresponding to a highest priority operation request among the new operation request and the at least one existing operation request; and
controlling a first output device capable of performing the target operation among the plurality of output devices to perform the target operation,
wherein the priority setting information represents priority between the new operation request and the at least one existing operation request corresponding to at least one in-vehicle input,
wherein the operation request message comprises an execution command for the target operation and is authenticated by the external server based on driving condition information of the vehicle and pre-stored information about a relationship between the driving condition information of the vehicle and the target operation, and
wherein the pre-stored information about the relationship between the driving condition information of the vehicle and the target operation indicates that a target operation of turning on a lamp of the vehicle is executable when a driving time zone indicated by the driving condition information of the vehicle corresponds to night time.

13. The method of claim 12, further comprising:
controlling the communication circuitry to transmit, to the external server, a vehicle identification number and the encrypted identifier.

14. The method of claim 12, wherein the priority setting information is generated by the external server based on driving condition information of the vehicle.

15. The method of claim 12, wherein the controlling of the first output device comprises:
controlling the first output device to perform the target operation based on the new operation request, when the new operation request takes priority over the at least one existing operation request.

16. The method of claim 12, wherein the vehicle comprises a plurality of input interfaces configured to receive an execution command for an operation of the vehicle and generate an operation request message corresponding to the execution command, the control method further comprising:
determining a first input interfaces corresponding to an operation of the operation request message among the plurality of input interfaces; and
controlling the first input interface generate a new operation request.

17. The method of claim 12, further comprising:
obtaining at least one of operation condition information of the target operation or device condition information of the first output device from the first output device;
determining whether the target operation has been performed based on the at least one of the operation condition information or the device condition information; and
controlling the communication circuitry to transmit, to the external server, a feedback message indicating whether the target operation has been performed.

* * * * *